United States Patent [19]

Espenscheid

[11] 4,224,079
[45] Sep. 23, 1980

[54] ASPHALTIC PAVING COMPOSITIONS AND METHOD OF PREPARATION FROM SOLVENT REFINED COAL

[75] Inventor: Wilton F. Espenscheid, De Soto, Tex.

[73] Assignee: Mobil Oil Corporation, New York, N.Y.

[21] Appl. No.: 897,977

[22] Filed: Apr. 20, 1978

[51] Int. Cl.³ .............................................. C08L 95/00
[52] U.S. Cl. ..................................................... 106/274
[58] Field of Search ................................. 106/274, 275

[56] References Cited

U.S. PATENT DOCUMENTS

| | | | |
|---|---|---|---|
| 1,905,060 | 4/1933 | Rose et al. | 106/275 X |
| 2,340,847 | 2/1944 | Parkes | 106/280 |
| 2,640,787 | 6/1953 | Greaves et al. | 106/274 X |
| 2,949,430 | 8/1960 | Jörgensen | 264/29.1 X |
| 3,147,205 | 9/1964 | Ohsol et al. | 208/22 X |
| 3,303,122 | 2/1967 | Doelman | 208/45 |
| 3,382,084 | 5/1968 | Folkins et al. | 106/284 |
| 3,672,936 | 6/1972 | Ehrenreich | 264/29.2 X |
| 3,725,240 | 4/1973 | Baum | 208/22 |
| 3,968,023 | 7/1976 | Yan | 208/18 |
| 4,024,076 | 5/1977 | Miyake et al. | 106/274X |

*Primary Examiner*—Lorenzo B. Hayes
*Assistant Examiner*—Amelia B. Yarbrough
*Attorney, Agent, or Firm*—Charles A. Huggett; Raymond W. Barclay

[57] ABSTRACT

Asphaltic compositions are obtained by heating solvent refined coal and sulfur to a temperature of 250° F. to 800° F. to provide asphaltic pitch-like compositions which are useful as paving binders and coating compositions.

4 Claims, No Drawings

ASPHALTIC PAVING COMPOSITIONS AND METHOD OF PREPARATION FROM SOLVENT REFINED COAL

BACKGROUND OF THE INVENTION

1. Field of Invention

The invention relates to sulfur modified coal compositions in which coal-derived asphaltenes are used to produce asphaltic pitch-like compositions suitable for use as binder materials in the construction of asphalt paving structures.

2. Description of Prior Art

The use of sulfur in pitches, tars, bitumens and asphalts is well known in the art. One or more properties of such compositions can be improved by the presence of sulfur particularly when the composition is used in the surfacing of roads. As described in U.S. Pat. No. 3,738,853, sulfur-asphalt pavements are prepared by casting sulfur-asphalt-aggregate mixes. In U.S. Pat. No. 3,960,585 cast sulfur-asphalt compositions are prepared by mixing and/or heating sulfur and asphalt at elevated temperatures in the presence of hydrogen sulfide suppressants such as free radical inhibitors and redox catalysts. U.S. Pat. No. 3,970,468 discloses emulsions of sulfur in asphalt, bitumen or tar wherein the sulfur is dispersed in the form of particles not exceeding 10 microns by melting a mixture of sulfur and hydrocarbon above 120° C. and subjecting the mixture to a dispersing agitation.

Other references to the use of sulfur in various asphaltic products include the use of sulfur monochloride in admixture with olefin polymers and petroleum residuum as disclosed in U.S. Pat. No. 3,093,610 and compositions obtained by heating a mixture of bitumen, olefin polymer, sulfur and a sulfur-containing vulcanization accelerator as described in U.S. Pat. No. 3,992,340. U.S. Pat. No. 3,960,793 discloses blending "reject polypropylene" with asphalts to product adhesives and molding compositions. The asphalts may be treated with sulfur or halogen-containing materials to increase their consistency.

Summary of Invention

Solvent refined coal is blended with sulfur at temperatures of 250° to 800° F. for a period of time sufficient to effect intimate dispersion of the reactants. The sulfur may be blended during the initial liquefaction of coal or may be blended with solvent refined coal at the temperatures indicated above. By means of the invention, coal-derived asphaltenes are used to provide sulfur-asphalt composites which have utility as substitutes for petroleum-derived materials, e.g. paving binders and coating compositions.

DETAILED DESCRIPTION OF THE INVENTION

For purposes of definition the term "coal" refers to natural coals such as high- and low-volatile bituminous, lignite, brown coal or peat. The coal may be high-ash, high-metals, high-sulfur, and have poor caking characteristics, and still be quite suitable for use. Typical analyses of various coals are as follows:

| High Volatile A | |
| --- | --- |
| Sulfur | 1.33% |
| Nitrogen | 1.63 |
| Oxygen | 7.79 |
| Carbon | 80.88 |
| Hydrogen | 5.33 |
| Ash | 2.77 |
| Sub-Bituminous | |
| Sulfur | 0.21% |
| Nitrogen | 0.–8 |
| Oxygen | 15.60 |
| Carbon | 65.53 |
| Hydrogen | 5.70 |
| Ash | 3.99 |
| Lignite | |
| Sulfur | 0.53% |
| Nitrogen | 0.74 |
| Oxygen | 32.04 |
| Carbon | 54.38 |
| Hydrogen | 5.42 |
| Ash | 5.78 |

By the term "solvent-refined" coal is meant any of the purified carbonaceous materials produced by liquefaction of coal in a highly aromatic or partially hydrogenated aromatic solvent (e.g., tetralin, anthracene, recycle coal oil, and the like). The basic liquefaction of coal in old in the art and may be carried out in a number of ways, e.g., by using a hydrogen donor solvent or the hydrogenated product boiling from 350° to 750° F. which is obtained in the liquefaction of coal. Molecular hydrogen may be added to the liquefaction zone, if desired, and/or the liquefaction may be carried out in the presence of a catalyst and solvent under hydrogen pressure at temperatures between 650° F. and 750° F. to produce products as obtained in the H-coal process.

The product produced from coal liquefaction contains solvent, dissolved coal, cracked and hydrogenated products of coal, undissolved residue, and ash. When required, a solvent-rich liquefaction phase is separated from ash and other undissolved solids, and distillation of the liquefaction phase to remove the excess solvent and volatile components of the solution may be practiced. Recovery of the high boiling distillation residuum as "solvent-refined" coal is desired.

In a typical process, solvent-refined coal is produced by (1) heating a mixture of powdered coal and recycle coal solvent (e.g., a distillation fraction recovered in a coal liquefaction process) at a temperature of about 790° F. under a hydrogen pressure of about 1000–2000 psi for a period of about one hour; (2) separating the liquefaction phase from solids by filtration; (3) distilling the liquefaction phase to remove the volatile components which have a boiling point below about 600° F. at standard pressure; and (4) recovering solvent-refined coal which is substantially free of ash and has a much lower oxygen and sulfur content than the original coal starting material. The solvent-refined coal is about 50 percent soluble in benzene (insoluble in pentane) and about 50 percent soluble in pyridine (insoluble in benzene). Table I summarizes the physical and chemical characteristics of West Kentucky and Illinois types of coal, and the solvent-refined coal products derived therefrom in accordance with the above described liquefaction process.

The type of solvent-refined coal described in Table I contains about 50 percent by weight of asphaltene components. Table II summarizes the results of a chromatographic separation of solvent-refined coal components. The asphaltenes appear to be a mixture of polar hydrocarbons, indoles and benzofuran derivatives, each of which is substituted with phenyl and/or naphthyl groups. Solvent-refined coal is susceptible to spontaneous combustion because of the presence of asphaltene components.

TABLE I

| | West Kentucky 14 Coal | | | Illinois #6 Coal | | |
|---|---|---|---|---|---|---|
| | Dry | Dry Ash Free | SRC Product | Dry | Dry Ash Free | SRC Product |
| C | 72.98 | 79.0 | 87.6 | 70.22 | 79.4 | 85.3 |
| H | 5.12 | 5.9 | 4.8 | 4.75 | 5.4 | 5.6 |
| N | 1.33 | 1.4 | 2.0 | 1.42 | 1.6 | 1.8 |
| S | 3.06 | 3.3 | 0.8 | 3.22 | 3.6 | 0.9 |
| Ash | 8.48 | — | 0.7 | 11.57 | — | 1.5 |
| O | 9.03 | 9.8 | 3.4 | 8.82 | 9.9 | 4.3 |

Coal $C_{100}H_{89}N_{1.5}S_{1.5}O_9$
SRC $C_{100}H_{66}N_{1.9}S_{0.3}O_{2.9}$
7800 SCF $H_2$/ton coal
8.5 atoms H/100 C Coal $C_{100}H_{89}N_{1.5}S_{1.5}O_9$
SRC $C_{100}H_{78}N_{1.8}S_{0.4}O_{3.8}$
Yield SRC 55% ical constituents as represented in the following mass spectrometric analysis:

| Compound | Aromatics | Naphthenic/ Aromatics | Labile H2% |
|---|---|---|---|
| Alkyl-Benzene | 0.4 | | 0 |
| Napthene-Benzenes | | 1.0 | 0.03 |
| Dinaphthene-Benzenes | | 3.7 | 0.16 |
| Naphthalenes | 0.1 | | 0 |
| Acenaphthenes, (biphenyls) | | 7.4 | 0.08 |
| Fluorenes | | 10.1 | 0.11 |
| Phenanthrenes | 13.1 | | |
| Naphthene-phenethrenes | | 11.0 | 0.18 |
| Pyrenes, fluoranthenes | 20.5 | | 0 |
| Chrysenes | 10.4 | | 0 |
| Benzofluoranthenes | 6.9 | | 0 |
| Perylenes | 5.2 | | 0 |
| Benzothiophenes | 2.4 | | |
| Dibenzothiophenes | 5.4 | | |
| Naphthobenzothiophenes | | 2.4 | 0.04 |
| Total | 64.4 | 35.6 | 0.60 |

TABLE II

FRACTIONS OBTAINED BY LIQUID CHROMATOGRAPHY ON SILICA GEL OF W. KENTUCKY 14 SOLVENT REFINED COAL

| | Oil-like Compounds | | | | | Multifunctional Compounds[2] | | | |
|---|---|---|---|---|---|---|---|---|---|
| | | | | Asphaltenes[1] | | | | | |
| Fraction | #1 | #2 | #3 | #4 | #5 | #6 | #7 | #8 | #9 |
| Eluent | hexane | hexane 15% benzene | $CHCl_3$ | $CHCl_3$ 4% $Et_2O$ | $Et_2O$ 3% EtOH | MeOH | $CHCl_3$ 3% EtOH | THF 3% EtOH | Pyridine 3% EtOH |
| % in SRC[3] | 0.4 | 15 | 30 | 10.2 | 10.1 | 4.1 | 6.4 | 10.2 | 8.5 |

[1]Asphaltenes defined as benzene-soluble, pentane-insoluble compounds.
[2]Multifunctional products defined as pyridine-soluble, benzene-insoluble compounds.
[3]This analysis totals 94.9%; 5.1% of the SRC was not eluted from the column.

Certain petroleum solvents especially suitable for the liquefaction of coal are thermally stable, highly polycyclic aromatic mixtures which result from one or more petroleum refining operations. Representative heavy petroleum solvents include FCC main tower bottoms, TCC syntower bottoms, asphaltic material, alkane-deasphalted tar, coker gas oil, heavy cycle oil, FCC main tower clarified slurry oil, mixtures thereof, and the like.

The nominal properties of suitable petroleum solvents are as follows:

| Syntower Bottoms | |
|---|---|
| Sulfur | 1.13% |
| Nitrogen | 450 ppm |
| Pour Point | 50° F. |
| Initial Boiling Point | 489° F. |
| 95% Point | 905° F. |
| Conradson Carbon | 9.96 |
| FCC Clarified Slurry Oil | |
| Sulfur | 1.04% |
| Nitrogen | 4400 ppm |
| Pour Point | 50° F. |
| Initial Boiling Point | 470° F. |
| 95% Point | 924° F. |
| Conradson Carbon | 10.15 |
| Heavy Cycle Oil | |
| Sulfur | 1.12% |
| Nitrogen | 420 ppm |
| Initial Boiling Point | 373° F. |
| 95% Point | 752° F. |
| Conradson Carbon | 10.15 |

A FCC main column bottoms refinery fraction is a highly preferred solvent for the practice of the present invention process. A typical FCC main column bottoms (or FCC clarified slurry oil) contains a mixture of chemical constituents as represented in the following mass spectrometric analysis:

A typical FCC main column bottoms has the following nominal analysis and properties:

| Elemental Analysis, Wt. %: | |
|---|---|
| C | 89.93 |
| H | 7.35 |
| O | 0.99 |
| N | 0.44 |
| S | 1.09 |
| Total | 99.80 |

Pour Point, °F.: 50
CCR, %: 9.96
Distillation:
IBP, °F.: 490
5%, °F.: 800 (est.)
95%, °F.: 905

FCC main tower bottoms are obtained by the catalytic cracking of gas oil in the presence of a solid porous catalyst. A more complete description of the production of this petroleum fraction is disclosed in U.S. Pat. No. 3,725,240.

A FCC main column bottoms is an excellent liquefaction solvent medium for coal, peat, lignite, etc. solubilization because it has a unique combination of physical properties and chemical constituency. A critical aspect of solvating ability is the particular proportions of aromatic and naphthenic and paraffinic moieties characteristic of a prospective liquefaction solvent. A high content of aromatic and naphthenic structures in a solvent is a criterion for high solvating ability for solid organic waste liquefaction.

The solvating ability of a solid organic waste liquefaction solvent can be expressed in terms of specific types of hydrogen content as determined by proton nuclear magnetic resonance spectral analysis. Nuclear magnetic resonance characterization of heavy hydrocarbon oils is well developed. The spectra (60 μc/sec) are divided into four bonds ($H_\alpha$, $H_\beta$, $H_\gamma$ and $H_{Ar}$) according to the following frequencies in Hertz (Hz) and chemical shift (δ):

|    | $H_\alpha$ | $H_\beta$ | $H_\gamma$ | $H_{Ar}$ |
|----|------|-------|--------|---------|
| Hz | 0-60 | 60-100 | 120-200 | 360-560 |
| δ  | 0-1.0 | 1.0-1.8 | 2.0-3.3 | 6.0-9.2 |

The $H_{Ar}$ protons are attached to aromatic rings and are a measure of aromaticity of a solvent. $H_\alpha$ protons are attached to non-aromatic carbon atoms attached directly to an aromatic ring structure, e.g., alkyl groups and naphthenic ring structures. $H_\beta$ protons are attached to carbon atoms which are in a second position away from an aromatic ring, and $H_\gamma$ protons are attached to carbon atoms which are in a third position or more away from an aromatic ring structure.

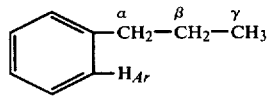

The $H_{Ar}$ protons are important because of their strong solvency power. A high content of $H_\alpha$ protons is particularly significant in a liquefaction solvent, because $H_\alpha$ protons are labile and are potential hydrogen donors in a solid organic waste liquefaction process. $H_\beta$ and $H_\gamma$ protons are paraffinic in nature and do not contribute to the solvating ability of a liquefaction solvent.

It is particularly preferred that the FCC main column bottoms employed as a solid organic waste liquefaction solvent in the present invention process has a hydrogen content distribution in which the $H_{Ar}$ proton content is between about 30 and 50 percent, the $H_\alpha$ proton content is at least about 30 percent and the $H_\alpha/H_\beta$ proton ratio is above about 1.4. Concomitantly it is desirable that the $H_\beta$ proton content is below 20 percent and the $H_\gamma$ proton content is below 13 percent. It is preferred that the highly aromatic hydrocarbon solvent component of this invention be a highly aromatic refinery petroleum residuum solvent having the above hydrogen content distribution and especially preferred that the highly aromatic refinery petroleum residuum solvent be selected from the group consisting of FCC main column bottoms and TCC syntower bottoms.

Petroleum solvents possessing the desired hydrogen content distribution are obtained as a bottoms fraction from the catalytic cracking or hydrocracking of gas oil stocks in the moving bed or fluidized bed reactor processes. In general depending upon such conditions as temperature, pressure catalyst-to-oil ratio, space velocity and catalyst nature, a high severity cracking process results in a petroleum residuum solvent having an increased content of $H_{Ar}$ and $H_\alpha$ protons and a decreased content of the less desirable $H_\beta$ and $H_\gamma$ protons.

The proton distribution in examples of various highly aromatic hydrocarbon by-product streams are shown below.

TABLE III

| Example | $H_\alpha$ | $H_\beta$ | $H_\gamma$ | $H_{Ar}$ | $H_\alpha/H_\beta$ | API° | VOP | Mean Average Boiling Pt. °F. |
|---|---|---|---|---|---|---|---|---|
| FCC/MCB | | | | | | | | |
| #1 | 36.0 | 19.3 | 12.7 | 32.0 | 1.87 | 4 | 9.9 | 822 |
| #2 | 36.4 | 13.6 | 5.2 | 44.8 | 2.68 | −2 | 10.0 | 850 |
| #3 | 18.5 | 50.0 | 14.3 | 17.1 | 0.37 | 14.1 | 10.4 | 650 |
| #4 | 18.1 | 48.8 | 18.9 | 14.2 | 0.37 | | | |
| TCC/Syntower Bottoms | | | | | | | | |
| π1 | 29.8 | 20.9 | 7.9 | 41.4 | 1.42 | | | |
| #2 | 16.3 | 48.1 | 20.0 | 15.6 | 0.35 | | | |
| Clarified Slurry Oil | 19.4 | 48.5 | 16.5 | 15.5 | 0.40 | | | |
| Agha Jari Resid (850 + °F.) | 12.0 | 60.0 | 24.0 | 5.0 | 0.20 | | | |
| SRC Recycle Oil | 27.1 | 14.7 | 6.9 | 46.3 | 1.84 | | | |
| Coal Tar | 5. | — | — | 91. | — | | | |

From the foregoing it may be seen that hydrocarbons having the same general process derivation may or may not have the desired proton distribution identified in the foregoing discussion. For example, FCC/MCB #1 and #2 have the desired proton distribution while FCC/MCB #3 and #4 do not.

Solvents FCC/MCB #1 and TCC/Syntower Bottoms #2 were compared for dissolution of lignite at 750° F. for one hour in a stirred autoclave. 90.0 grams of solvent mixed with 60.0 grams lignite yielded the following results:

TABLE IV

| Solvent | FCC/MCB #1 | TCC/Syntower Bottoms #2 |
|---|---|---|
| Coal | Lignite | Lignite |
| Temperature, °F. | 750 | 750 |
| Time, hr. | 1 | 1 |
| Wt. Coal, g | 60 | 60 |
| Wt. Solvent, g | 90 | 90 |
| Conversion, Wt. %[a] | | |
| Pyridine Solubles | 37.6 | 13.5 |
| Gas | 16.4 | 11.6 |
| Water | 5.9 | 0.7 |
| Unconverted | 40.1 | 72.84 |
| Conversion, Wt. % | 59.9 | 27.16 |

[a]Moisture, ash, and solvent free.

As shown above solvent #2 is far inferior and, except for some gas and water, leaves 72 percent of the coal unconverted. Solvents FCC/MCB #1 and TCC/Syntower Bottoms #1 (see Table III) were further evaluated for dissolution of a W. Kentucky coal in an atmospheric reactor. Analysis of the coal was as follows:

|  |  |  |
|---|---|---|
| % C | - | 73.06 |
| % H | - | 5.00 |
| % O | - | 9.17 |
| % S | - | 2.97 |
| ASH | - | 8.33 |
| Free Swelling Index | - | 4 |

TABLE V

| Solvent | FCC/MCB #1 | TCC/Syntower Bottoms #2 |
|---|---|---|
| Coal | W. Kentucky | W. Kentucky |
| Temperature, °F. | 750 | 750 |
| Time, hr. | 1 | 1 |
| Wt. Coal, g | 200 | 200 |
| Wt. Solvent, g | 440 | 440 |
| Conversion, Wt. %[a] | | |
| Pyridine Solubles | 46.8 | 29.4 |
| Gas | 6.9 | 4.5 |
| Water | 2.0 | 6.5 |
| Unconverted | 44.3 | 59.6 |
| Conversion, Wt. % | 55.7 | 40.4 |

[a]Moisture, ash, and solvent free.

Although a preferred liquefaction solvent is derived from petroleum, it may be noted in Table III that SRC recycle solvent closely resembles FCC/MCB #1 and #2, particularly in the $H_\alpha/H_\beta$ ratio. The following table from an article entitled "Recycle Solvent Techniques for the SRC Process," by R. P. Anderson, appearing in *Coal Processing Technology*, Volume 2 Am. Inst. of Chem. Engr., pages 130–32 (1975), shows that some SRC recycle solvents may conform to the hydrogen distribution requirements of the highly aromatic petroleum residuum solvent component of the present invention. Shown in the table are the hydrogen distribution changes which occur during multiple passes of recycle solvent through the coal extraction step of an SRC process. The initial solvent employed was Gulf Carbon Black Feedstock FS 120.

|  | | $H_\alpha$ | $H_\beta$ | $H_\gamma$ | $H_{Ar}$ | $H_\alpha/H_\beta$ |
|---|---|---|---|---|---|---|
| Gulf FS 120 | | 29.7 | 31.4 | 9.2 | 29.7 | 0.94 |
| | Pass 1 | 30.8 | 30.2 | 8.2 | 30.8 | 1.02 |
| | 2 | 31.3 | 28.4 | 7.1 | 33.2 | 1.10 |
| | 3 | 29.9 | 26.7 | 7.4 | 36.0 | 1.12 |
| | 4 | 30.3 | 24.7 | 6.9 | 38.1 | 1.23 |
| | 5 | 30.1 | 23.9 | 6.2 | 39.8 | 1.26 |
| | 6 | 28.8 | 22.3 | 7.0 | 41.9 | 1.29 |
| | 7 | 28.7 | 21.2 | 6.3 | 43.8 | 1.35 |
| | 8 | 29.4 | 20.1 | 5.8 | 44.7 | 1.46 |
| | 9 | 29.7 | 19.3 | 4.9 | 46.1 | 1.54 |
| | 10 | 30.0 | 18.8 | 4.7 | 46.5 | 1.60 |
| | 11 | 29.8 | 18.8 | 4.9 | 46.5 | 1.58 |
| Raw Anthracene Oil | | 18.9 | 3.4 | 0.6 | 77.1 | 5.6 |
| Partially Hydrogenated Anthracene Oil | | 20.5 | 8.6 | 1.6 | 69.3 | 2.4 |
| Anthracene Oil Recycle | | 23.3 | 15.2 | 4.7 | 56.7 | 1.53 |

As solvent is successively recycled through the coal extraction step of a solvent extraction process for converting coal to more valuable products, it takes on the characteristics of the coal being processed and, thus, its solvating ability is improved.

A surprising aspect of the present invention is the discovery that the highly aromatic petroleum residuum solvent component has characteristics remarkably similar to coal-derived solvents which may be recovered only after multiple passes through the coal extraction step of a solvent refining process and, furthermore, that the petroleum residuum solvent component has superior solvating ability for coal.

Liquefaction of coal by solvent extraction techniques using a petroleum solvent such as above described is carried out at temperatures ranging from 300° F. to 1000° F., preferably about 500° F. to 750° F. The solvent component in the liquefaction reaction mixture is provided in a quantity between about 0.5 and 10 parts by weight per part by weight of finely divided or comminuted coal component. Normally, the preferred ratio will be in the range between about 1.0 and 5 parts by weight of solvent per part by weight of coal.

The liquefaction step is usually carried out for a period of time between 0.2 and 3 hours and preferably about 0.5 to 1.5 hours until substantially all of the comminuted coal is dissolved. The resulting mixture of liquids and solids may be separated by conventional methods such as filtration, centrifugation or a similar operation. It is desirable to maintain the separation zone at a temperature between about 200° F. and 500° F. during the liquid-solids separation step.

Preparation of the asphaltic pitch-like compositions is accomplished by mixing the solvent refined coal together with 0.5 to 50 percent by weight, preferably 20 to 40 percent by weight, based on the solvent refined coal, of sulfur or a sulfur containing material. The mixture is heated at a temperature within the range from about 250° F. to 800° F. for a period of time sufficient to liquefy the coal and intimately disperse the sulfur component. The temperature will vary depending on whether the solvent refined material is derived from coal, peat or lignite. With solvent refined coal the mixture is heated with agitation at a temperature within the range of about 450° to 700° F. to achieve a heavy oil or pitch-like material which can be blended with sulfur.

The sulfur may be added in the form of molten sulfur, sulfur powder, colloidal sulfur, or in any other convenient form, e.g. sulfur monochloride, polysulfides, alkylpolysulfides, and modified reaction products of sulfur with organic compounds such as dicyclopentadiene, styrene, and the like.

The sulfur component may be added in various ways. One preferred method is to sufficiently liquefy the solvent refined coal so that the sulfur can be dispersed therein with agitation. Alternatively the sulfur component may be added when the comminuted raw coal is initially liquefied with a solvent. In this embodiment, however, at temperatures above about 250° F. evolution of hydrogen sulfide occurs which is undesirable from an environmental standpoint. In this instance, to prevent undesirable emissions the liquefaction step can be carried out in the presence of a hydrogen sulfide suppressant as described in U.S. Pat. No. 3,960,585.

The asphalt compositions of the present invention provide a penetration value in the range of about 40–300 (ASTM D 5-49) and thus are suitable for use as paving binders in known or more conventional asphalt road building practice. If required, the hardness of the present invention asphalt composition can be modified by air-blowing, and either with or without the presence of a catalyst such as phosphorus pentoxide or zinc chloride. The preferred invention asphalt compositions have a ring and ball softening point in the range of about 150° F. to 185° F., and ductility of more than 100 centimeters at 77° F. (ASTM D 113-44).

Road paving asphalts as known in the art are graded according to penetration values at 77° F. as measured by the standard method of test for penetration of bituminous materials (ASTM D 5-52), the penetration values being measured as the tenths of a millimeter that a tapered standard needle (0.14 to 0.16 mm tip diameter) will penetrate the asphalt in five seconds with a 100 gram load. The overall acceptable penetration range for various asphalt binders used is from 40 to 300. The range 40–70 is generally for asphalt used in hot climates, 70–110 generally for temperate climates, and 110–300 generally for cold climates.

The following examples illustrate the best mode now contemplated for carrying out the invention.

EXAMPLE I

A mixture consisting of 60.0 g high-volatile "A" coal, 90.0 g FCC main column bottoms solvent, and 6.0 g NiZSM-5 catalyst was charged to a 300 cc stirred autoclave, and pressurized to 1000 psig with hydrogen. The contents were brought to 750° F. and held at this temperature for 30 minutes with stirring at approximately 500 rpm. At the end of this time the reactor jacket was quench-cooled with flowing cold water, and the contents were extracted with pyridine in a soxhlet extractor in order to determine the extent of coal liquefaction, and separate catalyst and unreacted solids. Analyses of the contents showed:

| | | | |
|---|---|---|---|
| Pyridine solubles | 135.18 | gm. | (Liquefied Coal + Solvent) |
| Unreacted coal | 5.01 | | |
| Catalyst + Ash | 7.14 | | |
| Gas | 8.4 | | |
| Water | .09 | | |
| | 155.82 | gm. | (99.9% recovery) |

The ash-free pyridine-soluble fraction from above was mixed with varying ratios of elemental sulfur, placed in covered containers, blanketed with $N_2$ gas brought to approximately 300° F., and held at these conditions for 15 minutes, whereupon the samples were cooled and observed.

Mixtures for solvent-refined coal/sulfur containing 20 and 42 weight percent sulfur appeared to be glassy solids potentially suitable for coating materials. These two samples were frozen at −10° C. and fractured with a sharp blow. The shiny smooth nature of the fracture indicated a high degree of mutual solubility of the mixture. A dull lack-lustre fracture would denote a two-phase mixture.

EXAMPLE II 300.0 g High Volatile "A" sub-bituminous coal and 375.0 g FCC main column bottoms solvent were charged to a 2-liter, 4-necked glass flask equipped with stirrer and take-off condenser and brought to, and held at, 700° F. for 1 hour at atmospheric pressure. During this time, 3.75 g gas, 4.3 g $H_2O$, and 12.4 g light oil distilled over. The resultant product is a soft semi-solid at room temperature, with a softening-point (ring and ball) of 113° F.

A sample of the above product (24.75 g) was extracted with pyridine in a soxhlet extractor to remove ash and unreacted coal (in lieu of hot filtration to separate solids), and the pyridine was removed by vacuum distillation. These pyridine solubles (22.2 g) were blended with sulfur at 300° F. to yield compositions containing 10 and 20 percent sulfur by weight.

The blends were treated and examined as in the previous example. Both products were pliable homogeneous mixtures that appeared suitable for coating and paving binders.

What is claimed is:

1. A process for preparing asphaltic pitch-like compositions from coal suitable for use as paving binders and coating compositions which comprises blending comminuted solvent refined coal with 0.5 to 50 percent by weight sulfur, heating the mixture with agitation at a temperature of 250° to 800° F. for a period of time sufficient to effect dispersion of sulfur therein, and thereafter recovering a flowable heavy oil having a pitch-like consistency.

2. A process for liquefaction of coal to provide asphaltic compositions suitable for use as paving binders which comprises forming a slurry of comminuted coal with 0.5 to 50 percent by weight of added sulfur based on the weight of coal, and between about 0.5 and 10 parts by weight per part by weight of coal of a petroleum solvent having a boiling point between about 450° F. and 1100° F. and a hydrogen content distribution in which the $H_{Ar}$ proton content is between about 30 and 50 percent, the $H_\alpha$ proton content is at least 30 percent and the $H_\alpha/H_\beta$ proton ratio is above about 1.4; heating the slurry at a temperature in the range between about 300° F. and 1000° F. for a period of time sufficient to dissolve the slurry, and thereafter recovering a flowable heavy oil having a pitch-like consistency.

3. A process in accordance with claim 2 wherein the petroleum solvent is a FCC main column bottoms.

4. A process in accordance with claim 2 wherein the petroleum solvent is a TCC syntower bottoms.

* * * * *